United States Patent
Garbagnati

(10) Patent No.: US 6,779,653 B2
(45) Date of Patent: Aug. 24, 2004

(54) CHAIN CONVEYOR LINK WITH IMPROVED STRUCTURE

(75) Inventor: Carlo Garbagnati, Castello Brianza (IT)

(73) Assignee: Regina Sud S.p.A., Borgo San Michele (IT)

(*) Notice: Subject to any disclaimer, the term of this patent is extended or adjusted under 35 U.S.C. 154(b) by 0 days.

(21) Appl. No.: 10/326,990

(22) Filed: Dec. 24, 2002

(65) Prior Publication Data

US 2003/0121762 A1 Jul. 3, 2003

(30) Foreign Application Priority Data

Dec. 28, 2001 (IT) .................................... MI20010682 U

(51) Int. Cl.[7] ............................................. B65G 17/06
(52) U.S. Cl. ...................................................... 198/853
(58) Field of Search ........................................ 198/853

(56) References Cited

U.S. PATENT DOCUMENTS

| 4,611,710 A | * | 9/1986 | Mitsufuji | ................ 198/867.15 |
| 5,586,643 A | * | 12/1996 | Zabron et al. | ............... 198/853 |
| 5,954,190 A | * | 9/1999 | Takahashi et al. | ........... 198/853 |

* cited by examiner

*Primary Examiner*—Richard Ridley
(74) *Attorney, Agent, or Firm*—Jacobson Holman PLLC

(57) ABSTRACT

A chain conveyor link (10) pressed in plastic material comprises a plate (11) defining on top a conveyance surface (12) of the conveyor.

Near the front and rear edges of the link there are seats (15,16) for hinging the link to the other similar links of the chain. Below the plate (11) but spaced therefrom is at least one longitudinal rib (18) extending between the hinging seats (15,16). The space (19) created between the plate and the rib allows better flatness both static and dynamic of the conveyance surface (12).

5 Claims, 1 Drawing Sheet

CHAIN CONVEYOR LINK WITH IMPROVED STRUCTURE

BACKGROUND OF THE INVENTION

The present invention relates to an innovative chain conveyor link.

In the prior art links pressed from plastic material and made up of an upper plate forming the conveyance surface and two front and rear hinging units are known. To make the link sufficiently rigid the plate is pressed integrally with one or more ribs running on the lower surface of the plate between the hinging units.

These ribs however cause considerable difficulties in link pressing because the shrinkage cavity which they cause in the mold leads to defects in flatness of the upper conveyance surface of the plate. These defects in turn cause unsteadiness of the articles conveyed by the conveyor.

In addition, since the pull of the link passes through the hinging axes which are at a lower level than the plate, to avoid bending of the plate caused by the pull it is necessary to realize quite strong and relatively high ribs. This implies sometimes excessive and in any case inefficient use of the link material.

The general purpose of the present invention is to remedy the above mentioned shortcomings by making available a link with improved structure which avoids flatness defects and at the same time uses material more efficiently.

SUMMARY OF THE INVENTION

In view of this purpose it was sought to provide in accordance with the present invention a chain conveyor link pressed in plastic material and comprising a plate defining on top a conveyor conveyance surface and near its front and rear edges link-hinging seats characterized in that below the plate but spaced therefrom is at least one longitudinal rib extending between the hinging seats.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles. In the drawings.

DETAILED DESCRIPTION OF THE INVENTION

Figure 1:
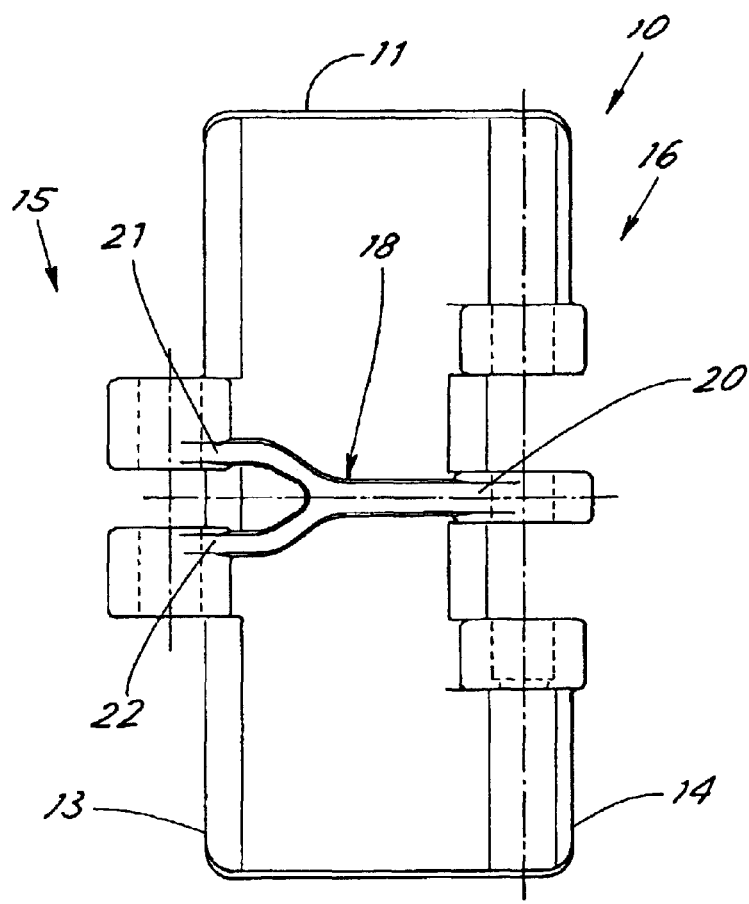
FIG. 1 shows a bottom plan view of the link in accordance with the present invention.

With reference to the figures, FIG. 1 shows a chain conveyor link pressed from plastic material and designated as a whole by reference number 10 and realized in accordance with the present invention. It comprises a top plate 11 which defines the top of a conveyance surface 12 of the conveyor.

Figure 3:
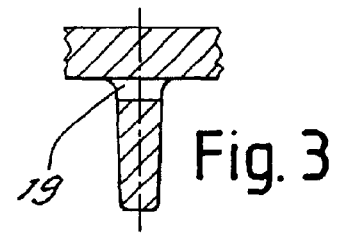
FIG. 3 shows a cross section along plane of cut III—III of FIG. 2.

Near the opposing edges 13 and 14, front and rear, of the link there are seats 15, 16 on the axes 17 for hinging of the link to other similar links to form the chain conveyor. As may be seen also in FIG. 2 and in cross section in FIG. 3, below the plate 11 but spaced therefrom is at least one longitudinal rib 18 extending between the hinging seats. As may be seen in the figures, between the bottom surface of the plate and the rib there is thus an empty space 19. In the advantageous embodiment shown the hinging seats comprise near one of said front or rear edges two side-by-side hinging eyelets 15 and near the other edge three side-by-side hinging eyelets 16 designed to receive between them the corresponding two eyelets of another similar link as is readily imaginable to those skilled in the art.

As may be seen in FIG. 1 advantageously in such a structure the rib 18 has a first end 20 ending on the central eyelet of the three side-by-side eyelets 16 while the other end of the rib splits into two branches 21 and 22 each of which ends on one of the two side-by-side eyelets 15.

Figure 2:
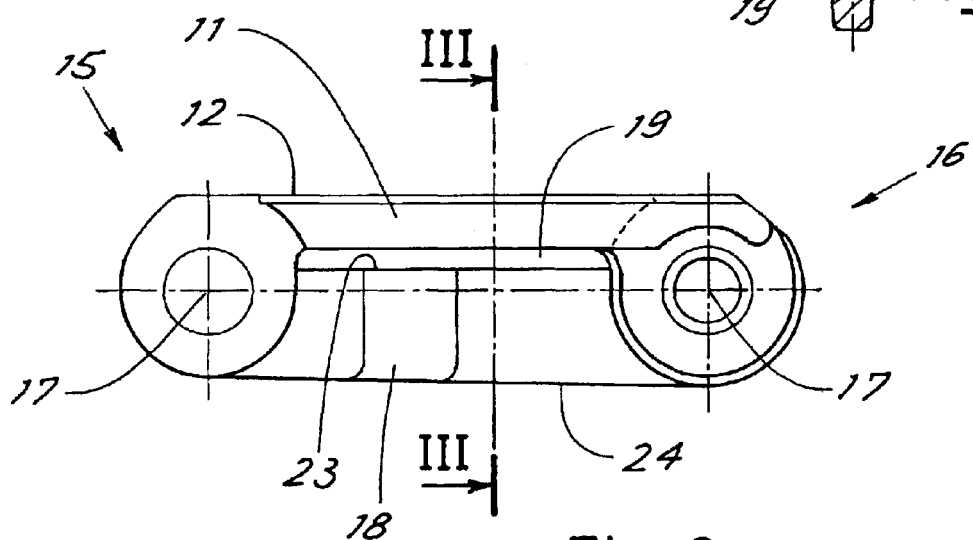
FIG. 2 shows a side elevation view of the link of FIG. 1.

Again advantageously the hinging axes 17 are located at a height (as seen in FIG. 2) between the upper edge 23 and the lower edge 24 of the rib. In particular it was found particularly advantageous that the rib be sized in such a manner that the hinging axes be located at a height closer to the upper edge 23 than to the lower edge 24 of the rib. As shown again in FIG. 2, in the embodiment shown the rib also has a lower edge 24 which is virtually planar with the lowest part of the rest of the link, i.e. in this specific case the hinging eyelets.

With a link as described above the problem of lack of flatness or the presence of hollows produced in the top surface of the prior art conveyance plate which was found to be caused by the pressing of the ribs connected to the bottom plane of the plate was eliminated.

In addition, the rib connected only to the ends and positioned as described is subject to pure traction to more effectively avoid distortions of the link caused by pulling of the chain. Better material use is also achieved.

In other words, the space 19 created between conveyance plate and rib allows better static and dynamic flatness of the conveyance surface.

Naturally the above description of an embodiment applying the innovative principles of the present invention is given by way of non-limiting example of said principles within the scope of the exclusive right claimed here. For example, proportions, number of parts and their exact conformation in the link can vary depending on the specific exigencies and also on the transversal width desired for the link. In particular, more ribs and more groups of hinging eyelets can be provided.

What is claimed is:

1. A chain conveyor link pressed in plastic material and comprising a plate defining a top conveyance surface having front and rear edges each containing hinging seats wherein below the plate, but spaced therefrom, is at least one longitudinal rib extending between the hinging seats.

2. The chain conveyor link in accordance with claim 1 wherein the hinging seats on either the front or rear edge contain two side-by-side hinging eyelets and the hinging seats on the other of the front or rear edge contain three side-by-side hinging eyelets designed to receive between them the corresponding two eyelets of another similar link, the link has at least one longitudinal rib with a first end ending on the central eyelet of said three side-by-side eyelets and the other end of the rib splitting into two branches each of which ends on one of said two side-by-side eyelets.

3. The chain conveyor link in accordance with claim 1 wherein the longitudinal rib has a lower edge which is substantially planar with the lower part of the rest of the chain conveyor link.

4. The chain conveyor link in accordance with claim 1 wherein the hinging seats have hinging axes which are at a height included between an upper edge and a lower edge of the longitudinal rib.

5. The chain conveyor link in accordance with claim 4 wherein said hinging axes are at a height closer to the upper edge than to the lower edge of the rib.

* * * * *